US 6,547,463 B1

(12) United States Patent
Loo

(10) Patent No.: US 6,547,463 B1
(45) Date of Patent: Apr. 15, 2003

(54) COLLAPSIBLE KEYBOARD

(76) Inventor: Jyh-Yi Loo, No. 68, Hai-Ching 3rd St., Hou-Tso Tsun, San-Chih Hsiang, Taipei Hsien (TW)

( * ) Notice: Subject to any disclaimer, the term of this patent is extended or adjusted under 35 U.S.C. 154(b) by 0 days.

(21) Appl. No.: 10/050,212

(22) Filed: Jan. 16, 2002

(51) Int. Cl.[7] .................................................. B41J 5/28
(52) U.S. Cl. ...................................... 400/472; 400/495
(58) Field of Search ................................ 400/472, 473, 400/489, 492, 495; 341/21, 22; 361/680; 235/145 R; 200/5 R; 345/168, 169; 248/118.5, 118.3, 118.1, 118

(56) References Cited

U.S. PATENT DOCUMENTS

| | | | | | |
|---|---|---|---|---|---|
| 5,574,481 | A | * | 11/1996 | Lee | 345/168 |
| 5,712,760 | A | * | 1/1998 | Coulon et al. | 361/680 |
| 5,888,386 | A | * | 3/1999 | Enright et al. | 210/169 |
| 5,943,041 | A | * | 8/1999 | Allison et al. | 345/168 |
| 6,081,207 | A | * | 6/2000 | Batio | 341/20 |
| 6,370,018 | B1 | * | 4/2002 | Miller et al. | 361/680 |
| 2002/0021935 | A1 | * | 2/2002 | Li | 403/119 |
| 2002/0033761 | A1 | * | 3/2002 | Katakami et al. | 341/22 |

* cited by examiner

Primary Examiner—Anthony H. Nguyen
(74) Attorney, Agent, or Firm—Brinks Hofer Gilson & Lione

(57) ABSTRACT

A collapsible keyboard includes left and right subframes hinged to each other at proximate lateral sides by a hinge member. The hinge member includes a mounting member with front and rear mounting portions pivoted to the subframes, two wing members hinged to lateral edges of the mounting member, and couplers disposed to link the subframes and the wing members. As such, the subframes are turnable between deployed and collapsed positions, where the subframes are planar and face towards each other, respectively. A locking mechanism is disposed over the proximate lateral sides of the subframes to lock the subframes in the deployed position.

12 Claims, 13 Drawing Sheets

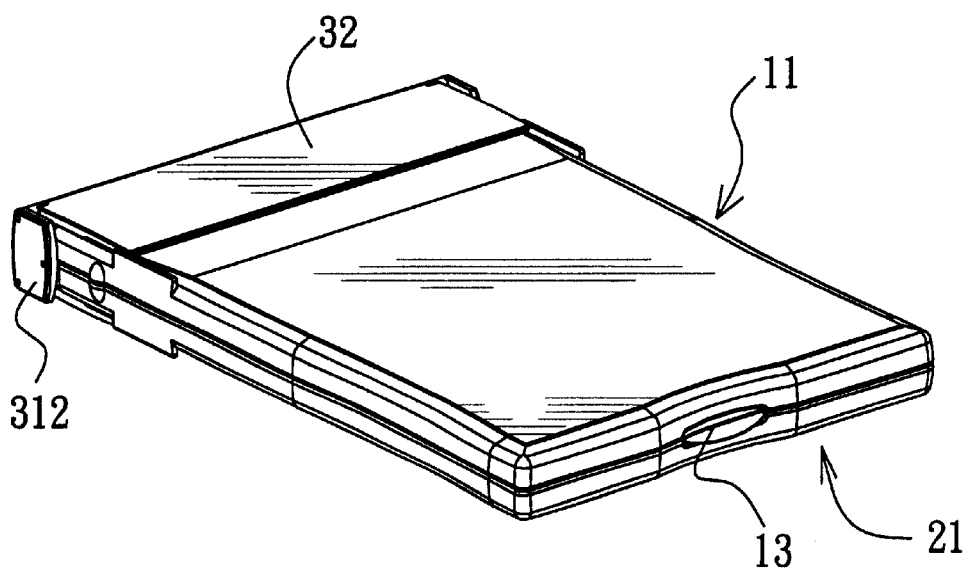
F I G. 9

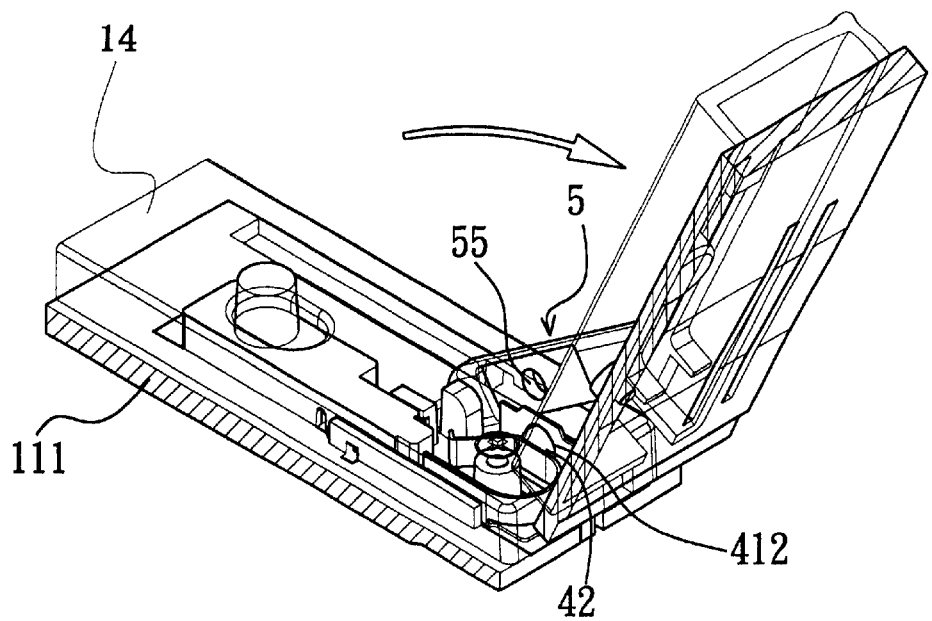
F I G. 11
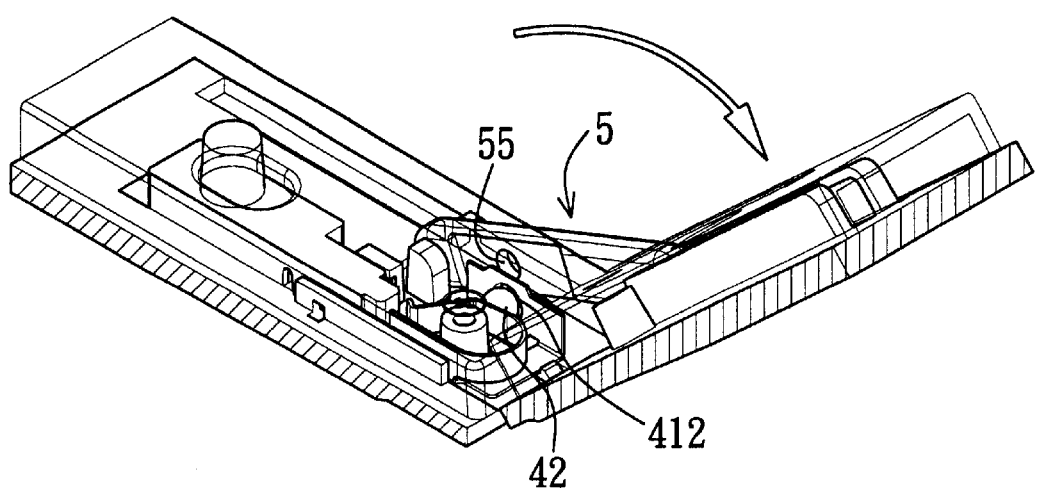
F I G. 12

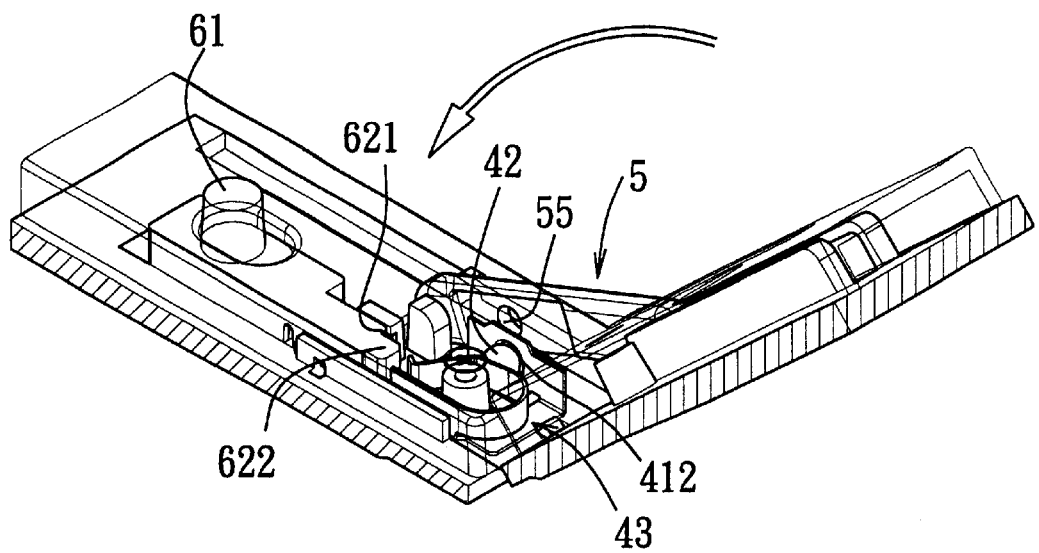
F I G. 15
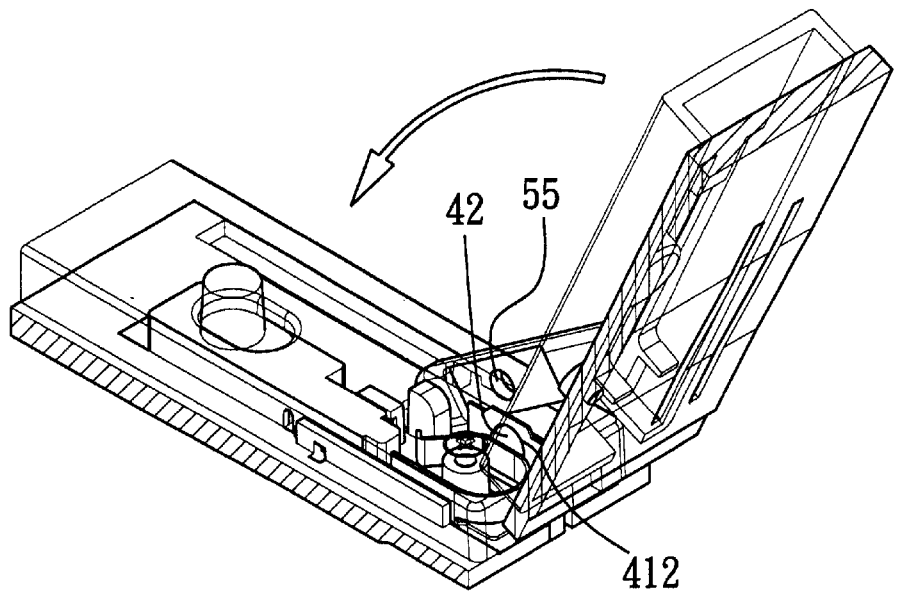
F I G. 16

COLLAPSIBLE KEYBOARD

BACKGROUND OF THE INVENTION

1. Field of the Invention

This invention relates to a collapsible keyboard, more particularly to a collapsible keyboard with left and right subframes which are foldable together in a face to face relationship without altering an arrangement of left and right sets of keys respectively disposed on the subframes.

2. Description of the Related Art

Referring to FIG. 1, a conventional collapsible keyboard for a portable computer device, such as a personal digital assistant or PDA, is shown to include left and right subframes 91, 92 which are pivotally mounted together by a hinge 94 that includes two wing members 93 respectively secured to proximate lateral sides of the left and right subframes 91,92. However, no means are provided for locking the left and right subframes 91,92 in the deployed position, thereby resulting in undesired turning and inconvenience during use. Moreover, the flush configuration of the proximate lateral sides of the left and right subframes 91,92 requires a change in the positions of keyboard keys distributed in a standard format familiar to users, thereby resulting in more inconvenience during use.

Referring to FIG. 2, another conventional keyboard 95 has a frame made of a thin flexible plate to facilitate arrangement of the keys in a standard format. However, a rigid support is required for supporting the keyboard 95 in a planar state during use, thereby resulting in inconvenience to the user.

SUMMARY OF THE INVENTION

The object of the present invention is to provide a collapsible keyboard which can overcome the aforementioned problems associated with the conventional collapsible keyboards.

According to this invention, the collapsible keyboard comprises a mounting member which includes a backbone portion extending in a transverse direction and having left and right lateral edges opposite to each other in a longitudinal direction, and front and rear ends opposite to each other in the transverse direction. Front and rear mount portions extend respectively and upwardly from the front and rear ends and terminate respectively at front and rear uppermost surfaces. Each of left and right subframes includes a major base wall and front and rear link walls extending respectively and upwardly from front and rear sides of the major base wall and terminating respectively at front and rear upper edge portions. The front and rear link walls respectively include front and rear linking areas which are located adjacent to both the front upper edge portion and a proximate lateral side of the major base wall, and to both the rear upper edge portion and the proximate lateral side, respectively. The front and rear linking areas are pivoted to the front and rear mount portions about a pivot axis in the transverse direction respectively at front and rear pivotal points that are adjacent to the front and rear uppermost surfaces, respectively. Left and right wing members include proximate edge portions which are hinged to the left and right lateral edges of the backbone portion respectively so as to place the left and right wing members in folded or spread positions, where distal edge portions of the left and right wing members are respectively close to or remote from each other. Left and right couplers are disposed to respectively link the front link walls of the left and right subframes at left and right coupled areas outboard to a respective one of the front linking areas, to forward sides of the left and right wing members at left and right engaged areas outboard to the proximate edge portions, respectively. As such, when the left and right wing members are in the folded or spread positions, the left and right subframes are placed in collapsed or deployed positions, where the distal lateral sides of the left and right subframes are respectively close to or remote from each other. Left and right sets of pluralities of keys are respectively disposed on the left and right subframes in an arrangement standing unaltered when the left and right subframes change from the collapsed position to the deployed position.

BRIEF DESCRIPTION OF THE DRAWINGS

Other features and advantages of the present invention will become apparent in the following detailed description of the preferred embodiments of the invention, with reference to the accompanying drawings, in which:

FIG. 9 is a perspective view showing the preferred embodiment in the collapsed state;

FIGS. 11 to 13 are perspective views showing the operation of the locking mechanism from the collapsed state to the deployed state;

FIGS. 15 and 16 are perspective views showing the operation of the locking mechanism from the deployed state to the collapsed state;

DETAILED DESCRIPTION OF THE PREFERRED EMBODIMENTS

Figure 1:
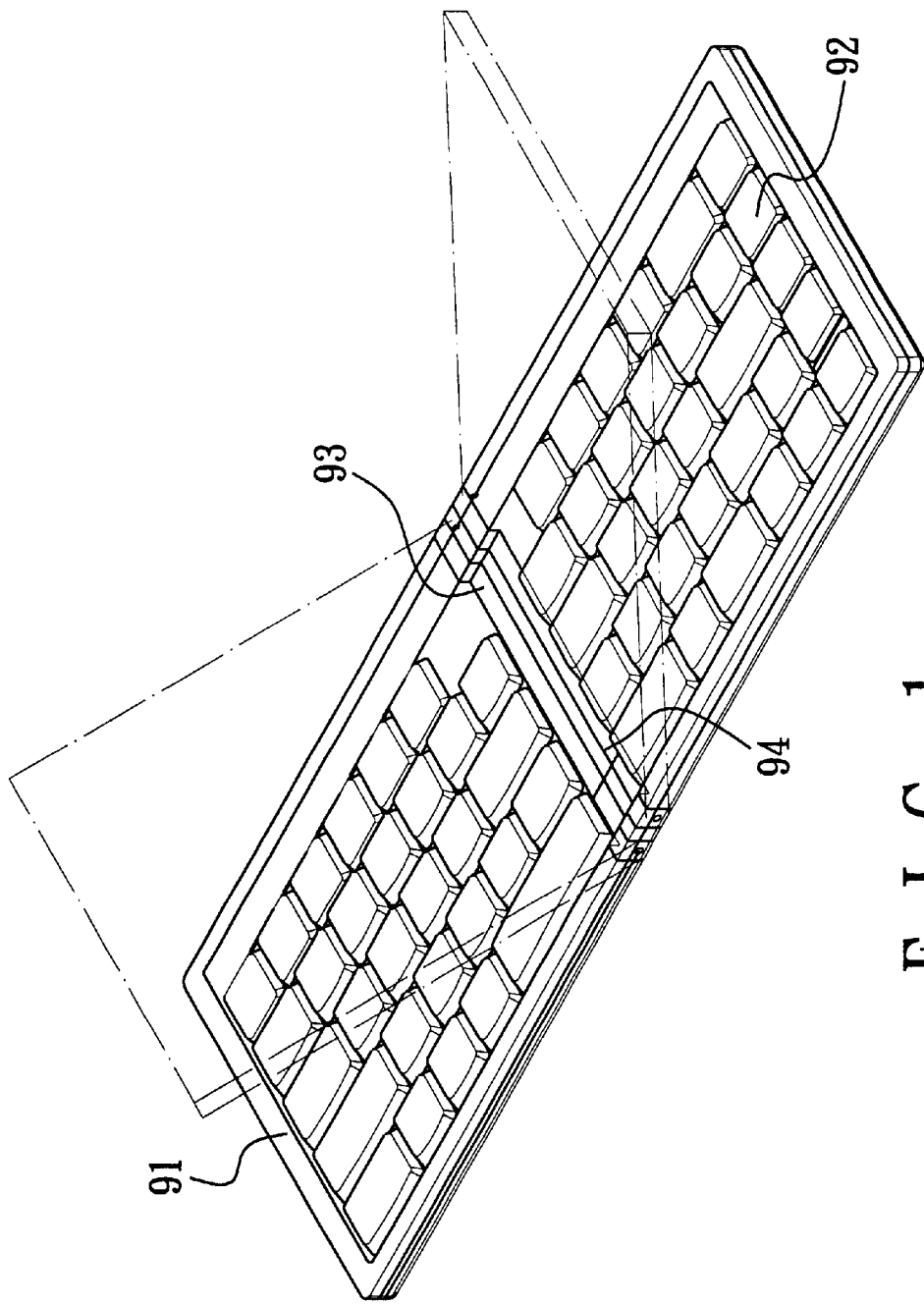
FIG. 1 is a perspective view of a conventional collapsible keyboard.
Figure 2:
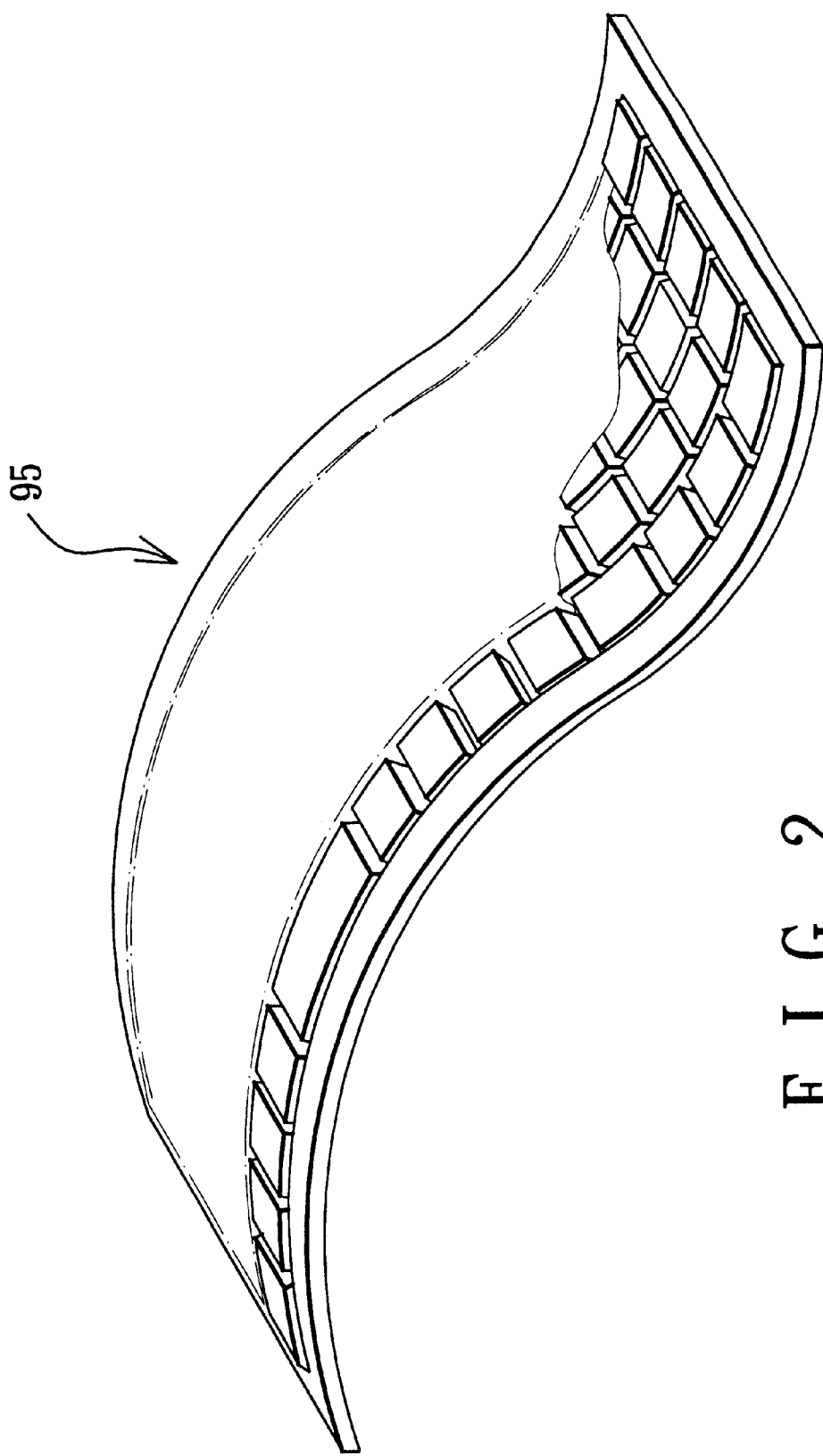
FIG. 2 is a perspective view of another conventional collapsible keyboard.
Figure 3:
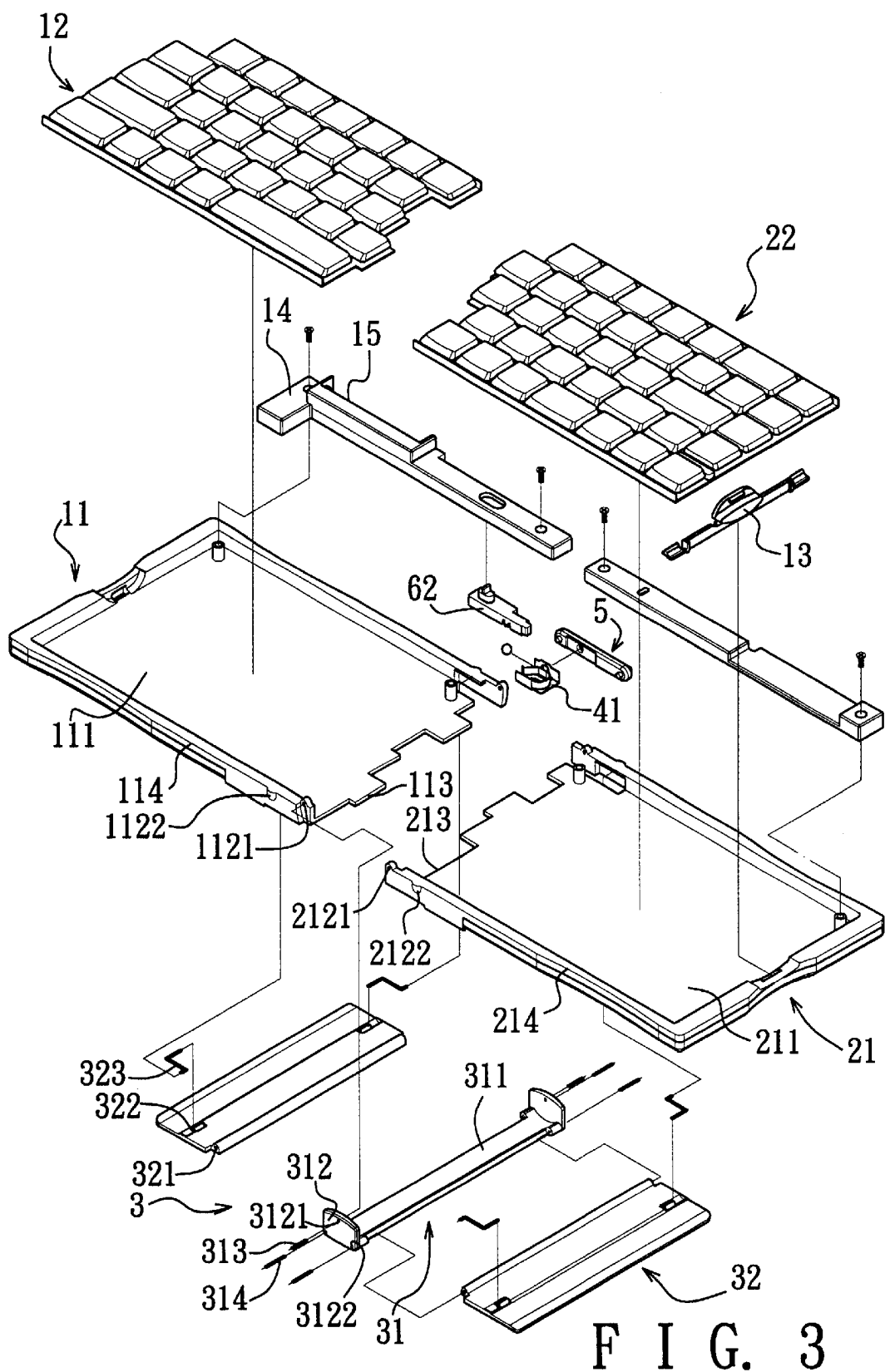
FIG. 3 is an exploded perspective view of a first preferred embodiment of a collapsible keyboard according to this invention.
Figure 4:
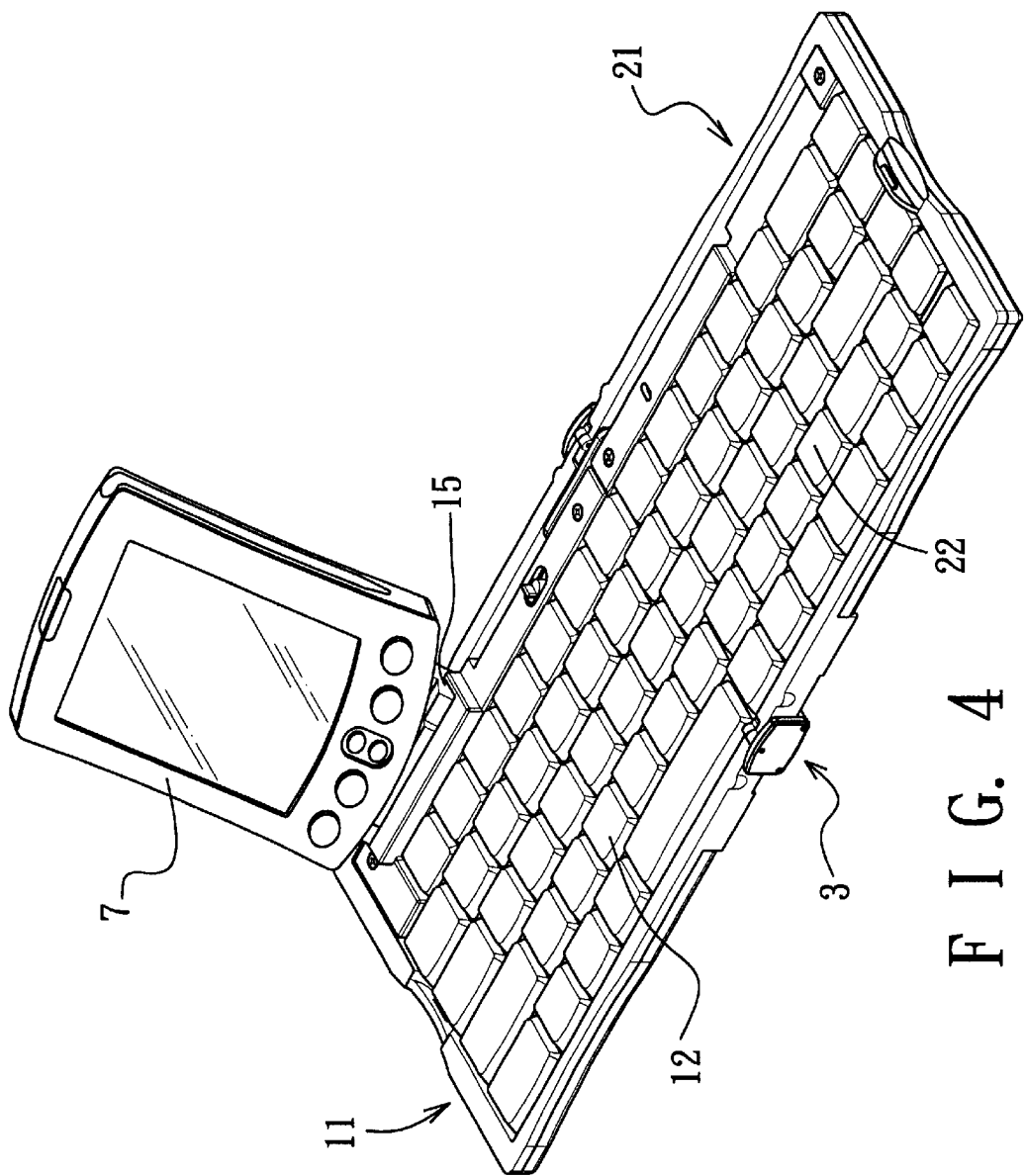
FIG. 4 is a perspective view of the preferred embodiment in a deployed state.

Referring to FIGS. 3 and 4, the first preferred embodiment of the collapsible keyboard according to the present invention is shown to comprise a hinge member 3, left and right subframes 11,21, left and right sets of pluralities of keys 12,22, and a locking mechanism.

Figure 5:
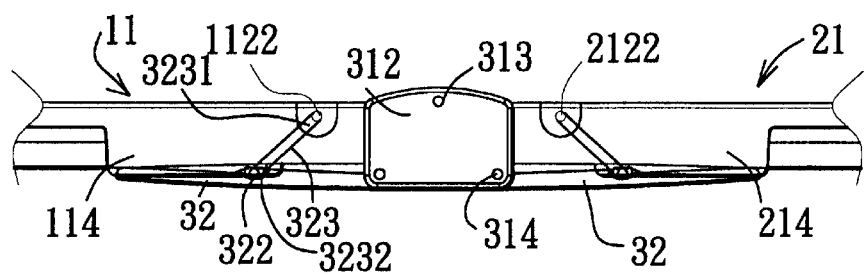
FIGS. 5 to 7 are schematic side views illustrating the folding operation of the preferred embodiment from the deployed state to a collapsed state.
Figure 8:
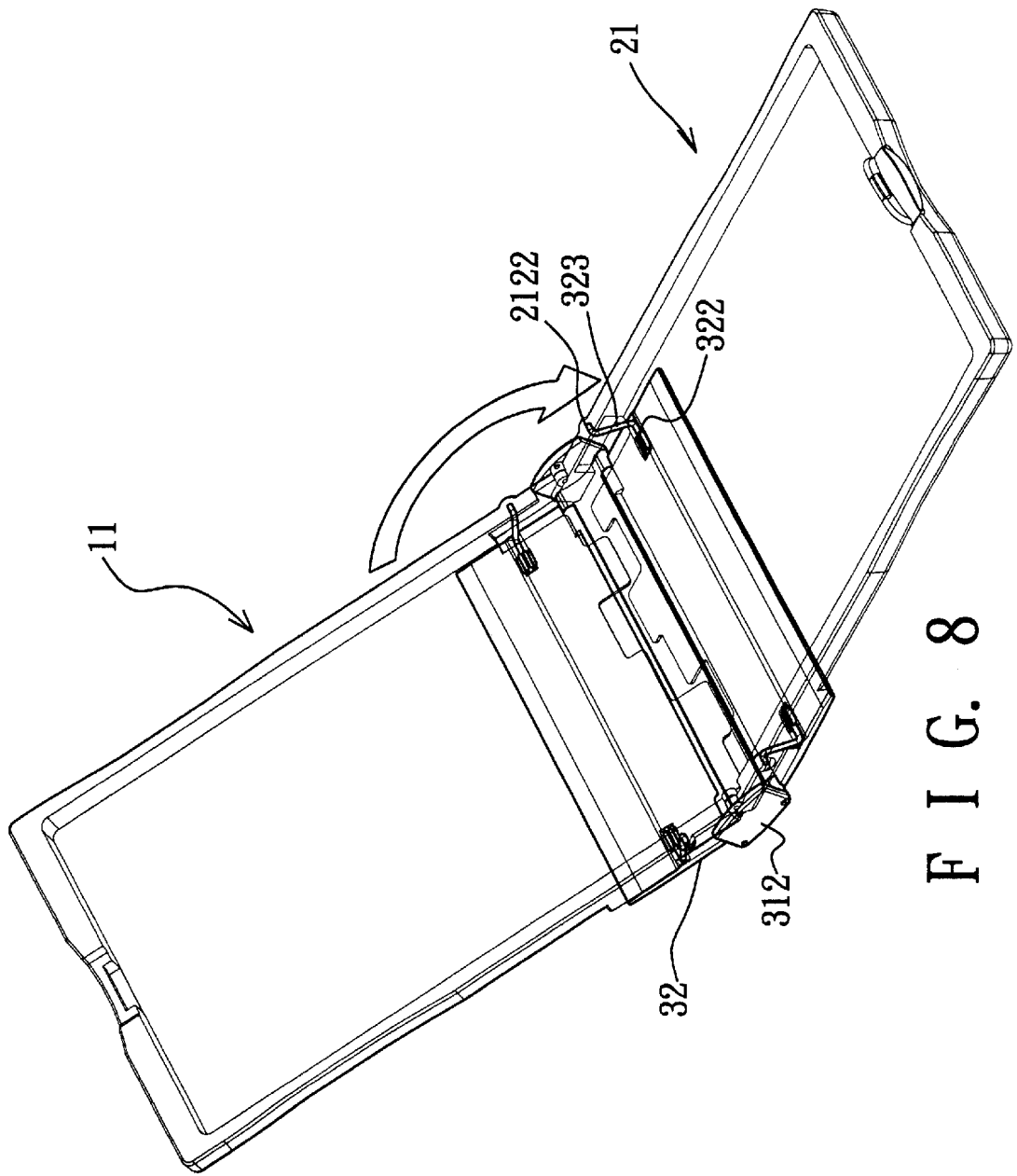
FIG. 8 is a perspective view showing a portion of the preferred embodiment.

With reference to FIGS. 5 and 8, the hinge member 3 includes a mounting member 31, and left and right wing members 32. The mounting member 31 includes a backbone portion 311 which extends in a transverse direction and which has left and right lateral edges 3122 opposite to each other in a longitudinal direction, and front and rear ends opposite to each other in the transverse direction, and front and rear mount portions 312 which extend respectively and upwardly from the front and rear ends of the backbone portion 311 and which terminate respectively at front and rear uppermost surfaces. Each of the left and right wing members 32 includes proximate and distal edge portions 321 opposite to each other in the longitudinal direction, and forward and rearward sides opposite to each other in the transverse direction. The proximate edge portions 321 of the left and right wing members 32 are disposed to be hinged to the left and right lateral edges 3122 of the backbone portion 31 respectively by means of pivot pins 314 so as to place the left and right wing members 32 in folded or spread positions where the distal edge portions of the left and right wing members 32 are respectively close to or remote from each other.

Each of the left and right subframes 11, 12 includes a major base wall 111,211 which has proximate and distal lateral sides opposite to each other in the longitudinal direction, and front and rear sides opposite to each other in the transverse direction, and front and rear link walls 114, 214 which extend respectively and upwardly from the front and rear sides of the major base wall 111,211 and which terminate respectively at front and rear upper edge portions. It is noted that the proximate lateral sides 113,213 of the major base walls 111,211 have configurations that correspond with the arrangement of a standard keyboard format. The front and rear link walls 114,214 respectively include front and rear linking areas 1121,2121 which are in the form of holes and which are located adjacent to both the front upper edge portion and the proximate lateral side 113,213 of the major base wall 111,211, and to both the rear upper edge portion and the proximate lateral side 113,213, respectively. The front and rear linking areas 1121,2121 are pivoted to the front and rear mount portions 312 by means of pivot pins 313 about a pivot axis in the transverse direction respectively at front and rear pivotal points 3121 that are adjacent to the front and rear uppermost surfaces of the front and rear mount portions 312, respectively.

Figure 6:
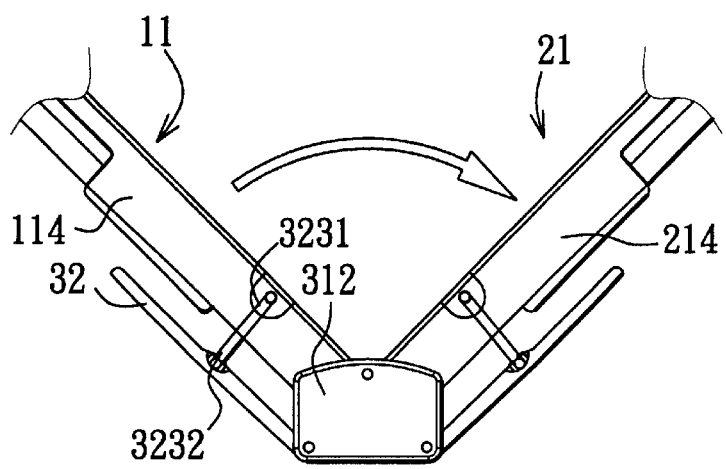
Figure 7:
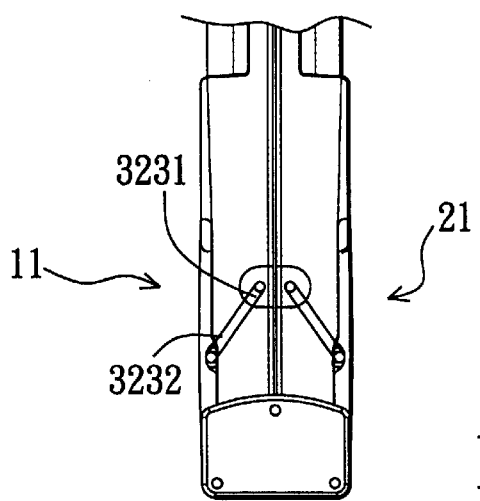

Two pairs of right and left couplers, in this embodiment, include two left levers 323 and two right levers 323. Each of the left and right levers 323 has first and second pivoted ends 3231,3232 which are mounted respectively and pivotally on the front (rear) link wall 114,214 at a respective one of left and right coupled areas 1122,2122 outboard to the front (rear) linking areas 1121,2121 and in the form of holes, and the forward (rearward) side of a respective one of the left and right wing members 32 at a respective one of left and right engaged areas 322 outboard to the proximate edge portions 321 and in the form of holes. As such, with reference to FIGS. 5 to 7, when the left and right wing members 32 are in the folded or spread positions, the second pivoted ends 3232 of the left and right levers 323 swing to the other side of the first pivoted ends 3231 in the longitudinal direction so as to place the left and right subframes 11,21 in a deployed position, where the distal lateral sides of the subframes 11,21 are remote from each other, or a collapsed position, where the distal lateral sides are close to each other. As shown in FIG. 9, a clip and recess locking member 13 is disposed on the left and right subframes 11,21 so as to lock the left and right subframes 11,21 in the collapsed position in a known manner.

The left and right sets of pluralities of keys 12,22 are disposed respectively on the left and right subframes 11,21 in an arrangement standing unaltered when the left and right subframes 11,21 change from the collapsed position to the deployed position.

Figure 10:
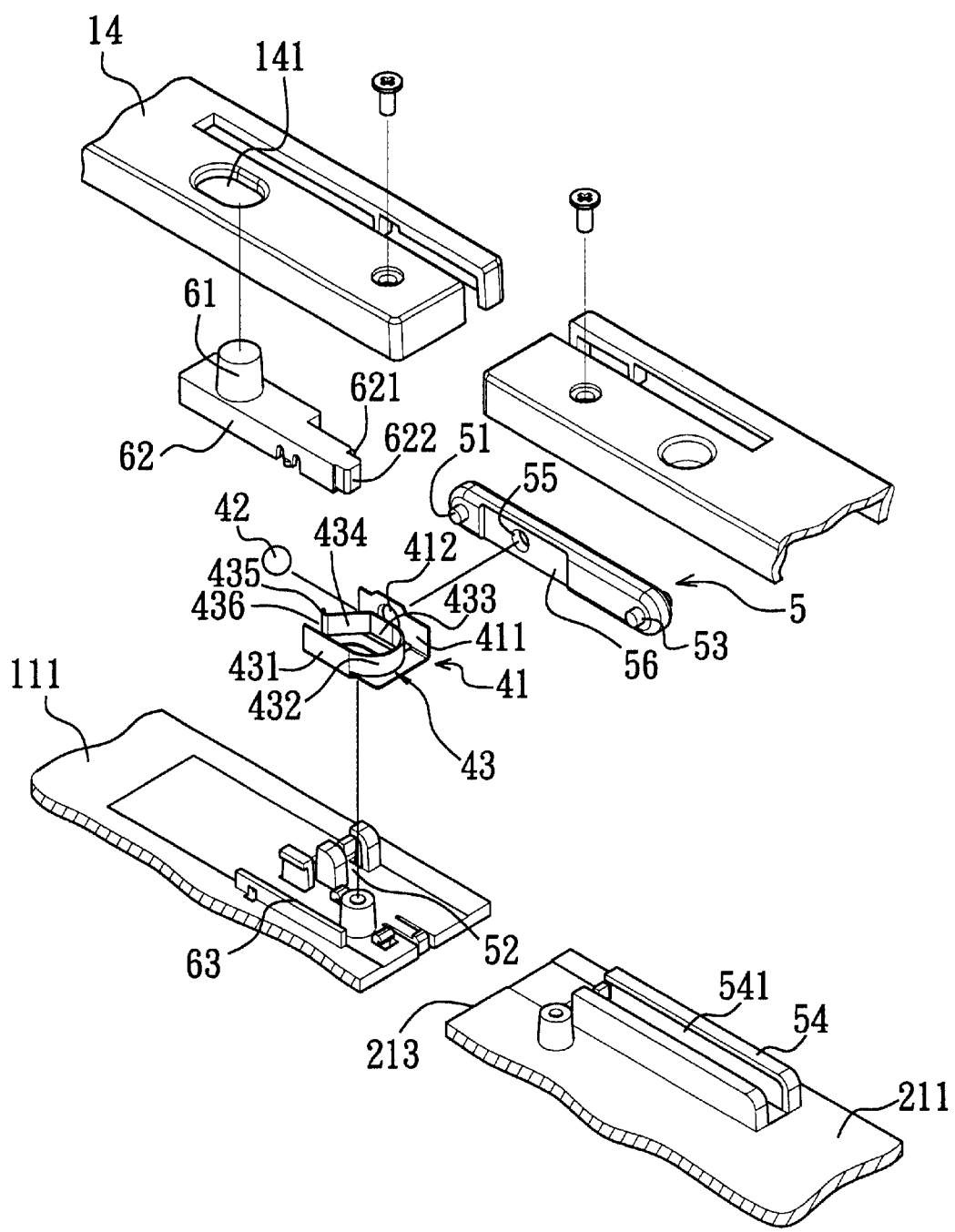
FIG. 10 is an exploded perspective view showing a locking mechanism of the preferred embodiment.

Referring to FIGS. 10 and 11, the locking mechanism is disposed to lock the left and right subframes 11,21 in the deployed position. The locking mechanism includes a pivotal mount 52, a bar 5, and a latch unit.

Figure 13:
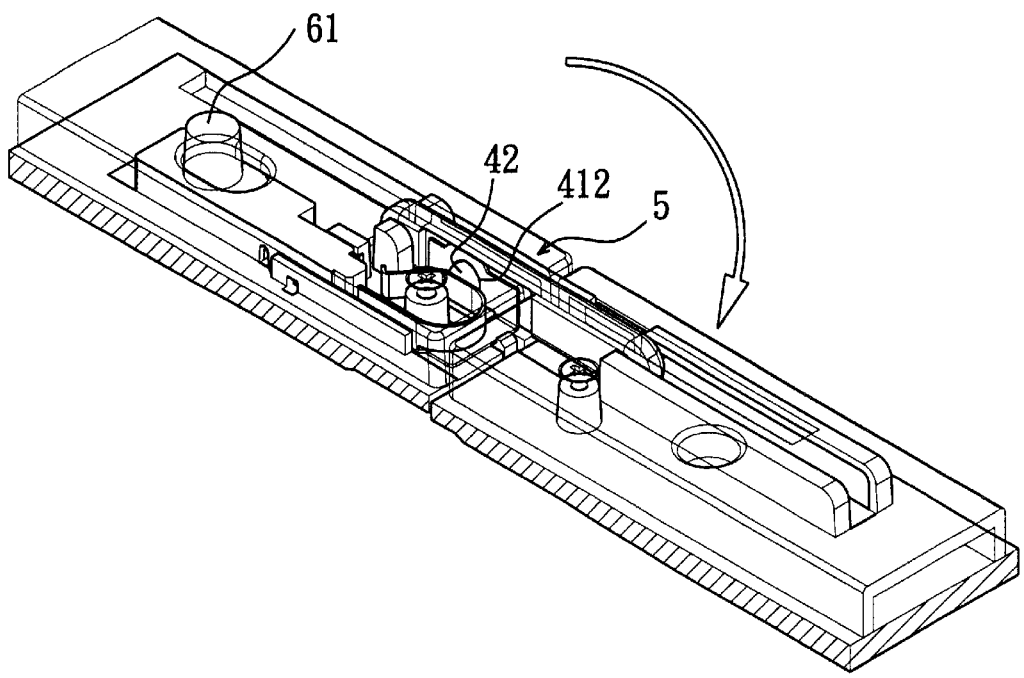

The pivotal mount 52 is disposed on the major base wall 111 of the left subframe 11 adjacent to the rear side, and defines a pivoting axis in the transverse direction. The bar 5 has an anchored end 51 which is pivoted to the pivotal mount 52 about the pivoting axis, and a slider end 53 which is disposed opposite to the anchored end 51 and which extends over to the major base wall 211 of the right subframe 21. A pair of elongate protrusions 54 are disposed on the major base wall 211 of the right subframe 21 and confine a guiding keyway 541 therebetween so as to guide the slider end 53 of the bar 5 to slide to be disposed close to or remote from the proximate lateral side 213 of the right subframe 21 in a locked or unlocked position when the left and right subframes 11,21 are in the deployed or collapsed positions, respectively, as shown in FIGS. 11 to 13. In addition, a latch hole 55 is formed in the bar 5 proximate to the anchored end 51, extends in the transverse direction, and faces forward.

The latch unit has a latch member which includes an L-shaped seat member 41 and a retaining ball 42. The seat member 41 is secured on the major base wall 111, and has an upright wall 411 which extends uprightly and forwardly of the pivotal mount 52. The upright wall 411 has front and rear surfaces opposite to each other in the transverse direction, and a retaining hole 412 that extends in the transverse direction to communicate the front surface with rear surface. As such, when the slider end 53 of the bar 5 is in the locked or unlocked position, the latch hole 55 is aligned or misaligned with the retaining hole 412 in the transverse direction, respectively. The retaining ball 42 is disposed forwardly of the front surface of the upright wall 411, and is movable between an engaged position and a disengaged position to engage and disengage the latch hole 55, where the latch hole 55 is aligned and misaligned with the retaining hole 412, respectively. Moreover, as shown in FIG. 10, a recessed portion 56 is formed,in the bar 5 to prevent the upright wall 411 from interfering with the movement of the slider end 53.

A biasing member 43 is formed as a U-shaped leaf spring, and is disposed on the seat member 41. The biasing member 43 includes a fixed segment 431, a curved segment 432, a first biasing segment 433 disposed opposite to the fixed segment 431 in the transverse direction and confronting the upright wall 411, a second biasing segment 434, and a bending portion 435 cooperating with the fixed segment 431 to confine an access 436. Thus, the first biasing segment 433 can bias the retaining ball 42 to engage the latch hole 55 so as to retain the slider end 53 in the locked position.

An arrester 62 is slidably disposed on the major base wall 111 and is guided by a slide seat 63. The arrester 62 has an urging portion 621 and an insert portion 622 at a right end thereof.

Figure 14:
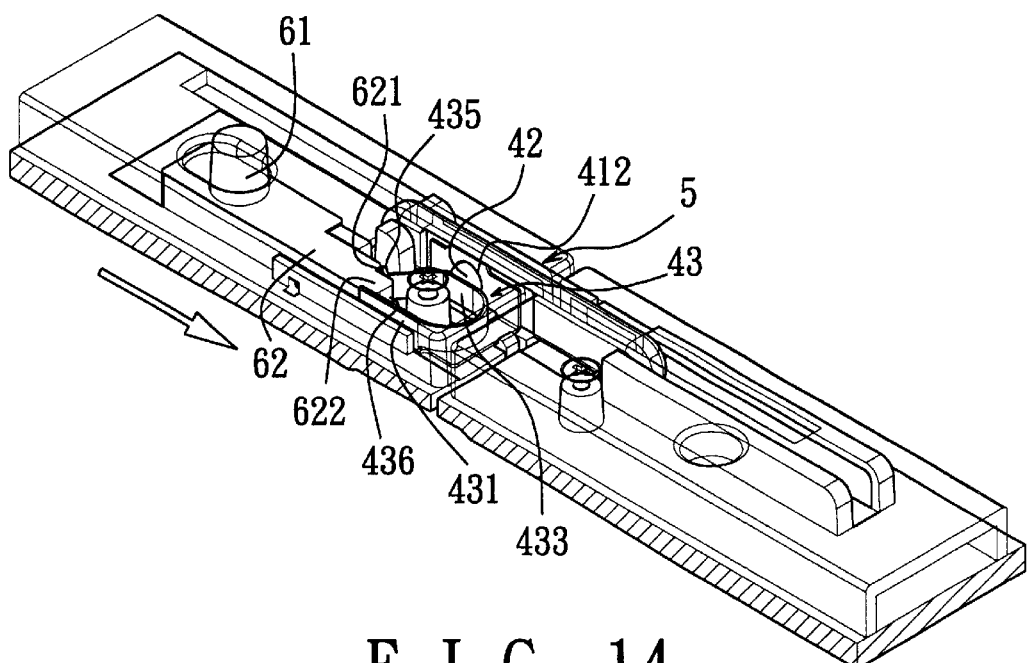
FIG. 14 is a perspective view showing the locking mechanism in an actuated state.

As such, referring to FIGS. 13 and 14, after disposing the left and right subframes 11,21 in the deployed position, the arrester 62 can be moved to a working position, where the insert portion 622 is inserted into the access 436, which permits the urging portion 621 to abut against the bending portion 435 of the biasing member 43 so as to arrest the biasing member 43 in an urging state to keep engagement between the retaining ball 42 and the latch hole 55. Referring to FIGS. 15 and 16, when it is desired to change the left and right subframes 11,21 from the deployed position to the collapsed position, the arrester 62 is first retracted to a non-working position, where the insert portion 622 is moved out of the access 436 and the biasing member 43 is freed from being arrested. Then, the right subframe 21 is turned to be disposed close to the left subframe 11 such that movement of the slider end 53 of the bar 5 from the locked position towards the unlocked position imparts the bar 5 with a pushing force exerted on the retaining ball 42, against the biasing action of the biasing member 43, so as to lift the retaining ball 42 out of the latch hole 55 to retain the retaining ball 42 between the bar 5 and the biasing member 43.

An actuator 61 is integrally formed with the arrester 62 at a left end thereof, and projects from an opening 141 in a cover member 14 which is disposed on the major base wall 111 adjacent to the rear side. The opening 141 extends in the longitudinal direction to permit the actuator 61 to be actuated manually to place the arrester 62 in the working or non-working position.

Moreover, referring to FIGS. 3 and 4, the cover member 14 has an insert slot 15 for extending an electronic device 7, such as a PDA, to connect electrically with a circuit board (not shown) mounted in the subframes 11,21.

As illustrated, in the deployed configuration, the keys 12,22 can be distributed on the subframes 11,21 in a standard format familiar to users. In addition, the subframes 11,21 can be changed between the deployed and collapsed positions smoothly without altering the positions of the keys 12,22. Moreover, by means of the locking mechanism, the user merely actuates the actuator 61 to move the arrester 62 in the working position so as to lock the subframes 11,21 in the deployed position.

Figure 17:
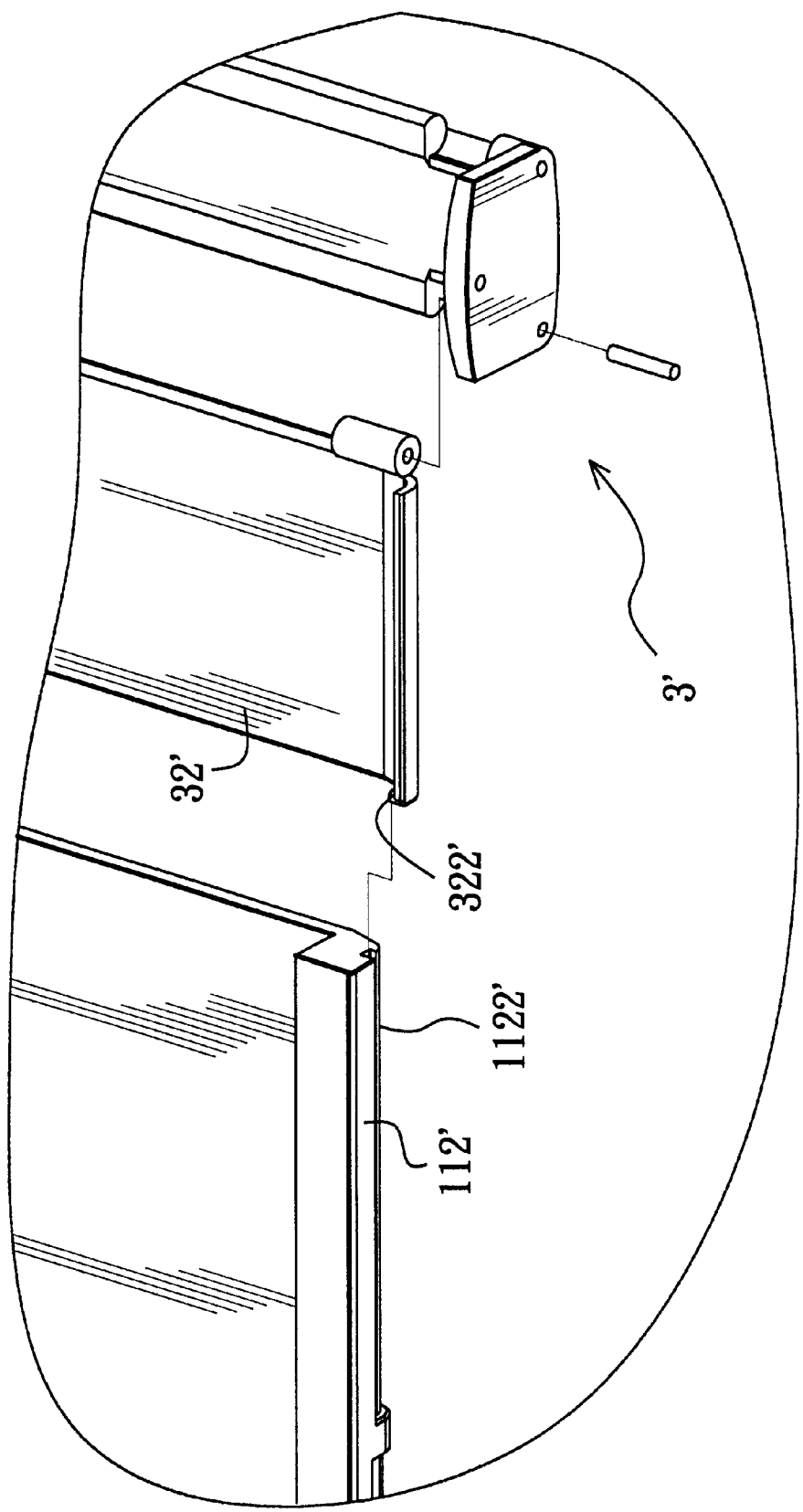
FIG. 17 is an exploded perspective view of a portion of a second preferred embodiment of the collapsible keyboard according to the invention.
Figure 18:
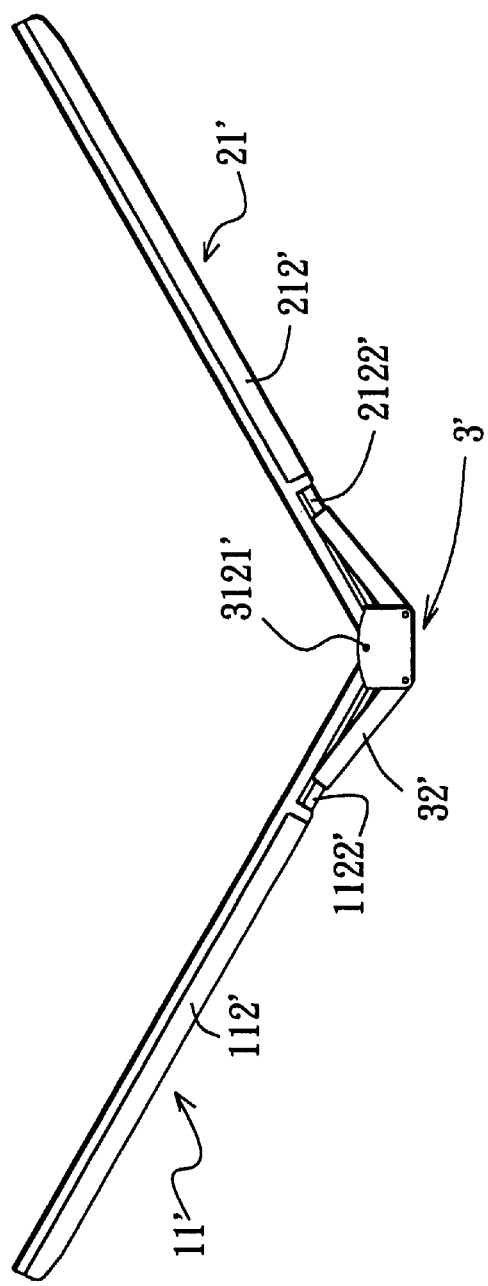
FIGS. 18 and 19 are schematic side views showing the deployment operation of the second preferred embodiment.
Figure 19:
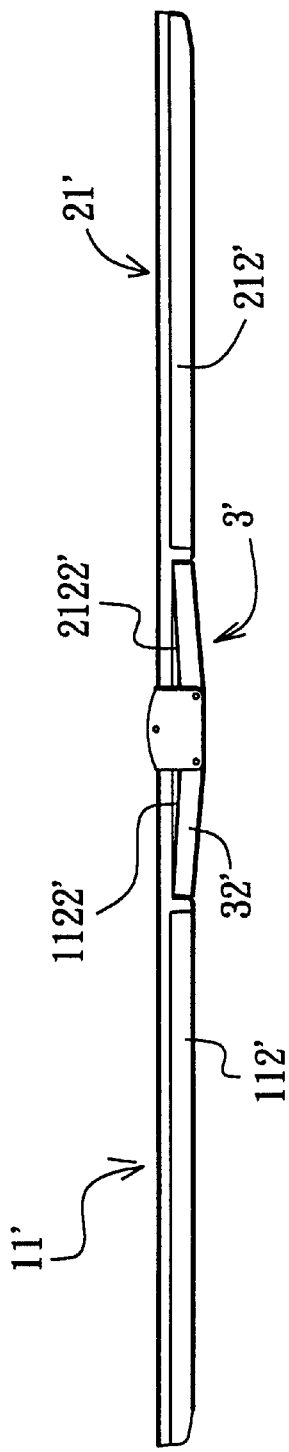

FIGS. 17 to 19 show the second preferred embodiment of the collapsible keyboard according to this invention to include a hinge member 3' which differs from the first embodiment in that the left and right couplers have left and right key portions 322' which are respectively disposed on and which extend from the left and right engaged areas of the left and right wing members 32' in the transverse direction, and left and right keyways 1122',2122' which are respectively disposed in the left and right coupled areas 112',212' of the left and right subframes 11',21' so as to slidably engage the left and right key portions 322', respectively. Each of the left and right keyways 1122',2122' moves towards the front and rear pivotal point 3121' when the left and right subframes 11',21' move from the deployed position to the collapsed position. Thus, during the collapsed operation, the wing members 32' attach to the subframes 11',21' so as to prevent dust contamination.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A collapsible keyboard comprising:
   a mounting member including a backbone portion which extends in a transverse direction and which has left and right lateral edges opposite to each other in a longitudinal direction, and front and rear ends opposite to each other in the transverse direction, and front and rear mount portions extending respectively and upwardly from said front and rear ends and terminating respectively at front and rear uppermost surfaces;
   left and right subframes, each including
      a major base wall having proximate and distal lateral sides opposite to each other in the longitudinal direction, and front and rear sides opposite to each other in the transverse direction, and
      front and rear link walls extending respectively and upwardly from said front and rear sides and terminating respectively at front and rear upper edge portions, said front and rear link walls respectively including front and rear linking areas which are located adjacent to both said front upper edge portion and said proximate lateral side, and to both said rear upper edge portion and said proximate lateral side respectively, and which are pivoted to said front and rear mount portions about a pivot axis in the transverse direction respectively at front and rear pivotal points that are adjacent to said front and rear uppermost surfaces respectively;
   left and right wing members, each including proximate and distal edge portions opposite to each other in the longitudinal direction, and forward and rearward sides opposite to each other in the transverse direction, said proximate edge portions of said left and right wing members being hinged to said left and right lateral edges of said backbone portion respectively so as to place said left and right wing members in folded or spread positions where said distal edge portions of said left and right wing members are respectively close to or remote from each other;
   left and right couplers disposed to respectively link said front link walls of said left and right subframes at left and right coupled areas outboard to a respective one of said front linking areas, to said forward sides of said left and right wing members at left and right engaged areas outboard to said proximate edge portions, respectively, such that when said left and right wing members are in the folded or spread positions, said left and right subframes are placed in collapsed or deployed positions, where said distal lateral sides of said left and right subframes are respectively close to or remote from each other; and
   left and right sets of pluralities of keys respectively disposed on said left and right subframes in an arrangement standing unaltered when said left and right subframes change from the collapsed position to the deployed position.

2. The collapsible keyboard of claim 1, wherein said left and right couplers include left and right levers, each of which has first and second pivoted ends respectively and pivotally mounted on a respective one of said left and right coupled areas and a respective one of said left and right engaged areas, such that when said left and right subframes change from the collapsed position to the deployed position, said second pivoted end swings to the other side of said first pivoted end in the longitudinal direction.

3. The collapsible keyboard of claim 1, wherein said left and right couplers include left and right key portions respectively disposed on and extending from said left and right engaged areas in the transverse direction, and left and right keyways respectively disposed in said left and right coupled areas so as to slidably engage said left and right key portions respectively, such that each of said left and right keyways moves towards said front pivotal points when said left and right subframes move from said deployed position to said collapsed position.

4. The collapsible keyboard of claim 1, further comprising a locking mechanism disposed over said proximate lateral sides of said left and right subframes to lock said left and right subframes in the deployed position.

5. The collapsible keyboard of claim 4, wherein said locking mechanism is disposed adjacent to said rear sides of said left and right subframes.

6. The collapsible keyboard of claim 5, wherein said locking mechanism includes
- a pivotal mount disposed on said major base wall of said left subframe, and defining a pivoting axis in the transverse direction,
- a bar having an anchored end pivoted to said pivotal mount about the pivoting axis, and a slider end disposed opposite to said anchored end and extending over to said major base wall of said right subframe, such that said slider end is close to or remote from said proximate lateral side of said right subframe when said left and right subframes are in the deployed or collapsed positions respectively,
- a guiding keyway disposed on said major base wall of said right subframe to guide said slider end to slide, and
- a latch unit disposed to place said slider end in a locked or unlocked position where said slider end is close to or remote from said proximate lateral side of said right subframe.

7. The collapsible keyboard of claim 6, wherein said latch unit has a latch hole disposed in said bar, disposed proximate to said anchored end, extending in the transverse direction, and facing toward said front link wall, a latch member disposed forwardly of and movable to engage and disengage said latch hole, a biasing member disposed to bias said latch member to engage said latch hole so as to retain said slider end in the locked position, and an arrester disposed to be movable between a working position, where said biasing member is arrested by said arrester in an urging state which keeps engagement between said latch member and said latch hole, and a non-working position, where said biasing member is freed from being arrested and is yieldable to a pushing force exerted on said latch member.

8. The collapsible keyboard of claim 7, wherein said latch member includes
- an upright wall disposed to extend uprightly from said major base wall of said left subframe and forwardly of said bar, said upright wall having front and rear surfaces opposite to each other in the transverse direction, said front surface having a retaining hole extending in the transverse direction to communicate with said rear surface, said latch hole being aligned or misaligned with said retaining hole in the transverse direction when said slider end is in the locked or unlocked positions, respectively, and
- a retaining ball disposed forwardly of said front surface and movable between an engaged position and a disengaged position, where said latch hole is aligned and misaligned with said retaining hole, respectively.

9. The collapsible keyboard of claim 8, wherein said latch hole is configured such that once said biasing member is freed from being arrested, the movement of said slider end from the locked position towards the unlocked position in the longitudinal direction imparts said bar with said pushing force which, against the biasing action of said biasing member, lifts said retaining ball out of said latch hole so as to retain said retaining ball between said bar and said biasing member.

10. The collapsible keyboard of claim 9, wherein said latch unit includes an actuator disposed to place said arrester in the working position or the non-working position.

11. The collapsible keyboard of claim 10, wherein said actuator is integrally formed with said arrester.

12. A collapsible keyboard comprising:
- left and right subframes, each including a major base wall which has proximate and distal lateral sides opposite to each other in a longitudinal direction, and front and rear sides opposite to each other in a transverse direction relative to the longitudinal direction;
- a hinge member pivotally connected to said proximate lateral sides of said left and right subframes about a pivot axis in the transverse direction such that said left and right subframes are turnable about the pivot axis between a deployed position where said major base walls of said left and right subframes are planar, and a collapsed position, where said major base walls face towards each other;
- left and right sets of pluralities of keys respectively disposed on said left and right subframes in an arrangement standing unaltered when said left and right subframes change from the collapsed position to the deployed position; and
- a locking mechanism disposed over said proximate lateral sides of said left and right subframes, and including
  - a pivotal mount disposed on said major base wall of said left subframe, and defining a pivoting axis in the transverse direction,
  - a bar having an anchored end pivoted to said pivotal mount about said pivoting axis, and a slider end disposed opposite to said anchored end and extending over to said major base wall of said right subframe, such that said slider end is close to and remote from said proximate lateral side of said right subframe when said left and right subframes are in the deployed and collapsed positions respectively,
  - a guiding keyway disposed on said major base wall of said right subframe to guide said slider end to slide, and
  - a latch unit disposed to place said slider end in a locked or unlocked position where said slider end is close to or remote from said proximate lateral side of said right subframe.

* * * * *